(12) United States Patent
Masuda et al.

(10) Patent No.: US 7,163,236 B2
(45) Date of Patent: Jan. 16, 2007

(54) VEHICLE OCCUPANT RESTRAINT SYSTEM AND VEHICLE OCCUPANT RESTRAINT METHOD

(75) Inventors: Daisuke Masuda, Zama (JP); Hideo Tobata, Yokosuka (JP); Kouichi Oota, Yamato (JP); Tetsuo Maki, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 11/294,520

(22) Filed: Dec. 6, 2005

(65) Prior Publication Data

US 2006/0119085 A1    Jun. 8, 2006

(30) Foreign Application Priority Data

Dec. 7, 2004    (JP)    ............................. 2004-354096

(51) Int. Cl.
*B60R 21/18* (2006.01)
(52) U.S. Cl. .................................................... 280/733
(58) Field of Classification Search ................ 280/733, 280/730.1, 801.1, 743.1
See application file for complete search history.

(56) References Cited

U.S. PATENT DOCUMENTS

2006/0028004 A1* 2/2006 Oota et al. .................. 280/733

FOREIGN PATENT DOCUMENTS

JP    2004-232428 A    8/2004
JP    2006-044614 A    2/2006

* cited by examiner

*Primary Examiner*—Faye M. Fleming
(74) *Attorney, Agent, or Firm*—Foley & Lardner LLP

(57) ABSTRACT

A vehicle occupant restraint system of the present invention has: a seat belt restraint device (13) including a shoulder belt (11) which restrains the body of a vehicle occupant (C) diagonally from one of the shoulders (Cs) to the chest (Cc), and a lap belt (12) which restrains the waist (Cw) of the vehicle occupant (C); an upper air bag (30) supported by an upper support point (32) provided on the shoulder belt (11); a lower air bag (31) supported by a lower support point (33) provided on the lap belt (12) and coming into contact with the upper air bag (30) in a vertical direction when being inflated and extended; and an air bag movement inhibiting structure (H1–H9). The air bag movement inhibiting structure (H1–H9) applies, to at least one of the upper support point (32) and the lower support point (33), a moment (M1–M13) in a direction of canceling movements of contact surfaces of the upper and lower air bags (30, 31) toward a side in the vehicle width direction, where a part of the shoulder belt (11) is located above the shoulder (Cs) of the vehicle occupant (C), when the upper air bag (30) and the lower air bag (31) receive inertial force of the vehicle occupant (C) toward a front of a vehicle.

16 Claims, 6 Drawing Sheets

VEHICLE OCCUPANT RESTRAINT SYSTEM AND VEHICLE OCCUPANT RESTRAINT METHOD

BACKGROUND OF THE INVENTION

1. Field of the Invention

The present invention relates to a vehicle occupant restraint system and a vehicle occupant restraint method for protecting a vehicle occupant by using an air bag in the case of a frontal collision of a vehicle.

2. Description of the Related Art

There exists a conventional vehicle occupant restraint system in which an air bag is equipped inside of a shoulder belt of a seat belt restraint device for restraining the shoulder and chest of a vehicle occupant, and the air bag is inflated and extended in the case of a collision of a vehicle, thereby protecting the vehicle occupant (refer to Japanese Patent Application No. 2004-232428).

Among vehicle occupant restraint systems in which the air bag is inflated and extended from the seat belt, as shown in FIG. 10, there exists a vehicle occupant restraint system in which two air bags, an upper air bag 3 and a lower air bag 4, are provided in a three-point seat belt restraint device 1 provided on a seat 2. The upper air bag 3 is supported by a shoulder belt 1a through an upper support point 5, and the lower air bag 4 is supported by a lap belt 1b through a lower support point 6. With such a construction, the upper air bag 3 with which the head of a vehicle occupant C interferes can be supported by the thighs of the vehicle occupant C through the lower air bag 4.

SUMMARY OF THE INVENTION

However, in the case of dividing the air bag extended from the seat belt into the upper and lower air bags 3 and 4, the shoulder belt 1a for supporting the upper air bag 3 is adapted to restrain the body of the vehicle occupant C diagonally from one of the shoulders to the chest. Accordingly, though the one shoulder of the vehicle occupant C is restrained by the shoulder belt 1a, the other shoulder is not restrained because the shoulder belt 1a is inclined downward.

Accordingly, when inertial force toward the front of a vehicle body is applied to the vehicle occupant owing to a head-on collision, a portion from the unrestrained shoulder to the chest turns into a state of bending down forward as shown by an arrow m in FIG. 11. Therefore, as shown in FIG. 11, by such a behavior of the vehicle occupant C, the upper air bag 3 rotates around the upper support point 5 in a direction shown by an arrow n.

Moreover, the lower air bag 4 also rotates in a direction of an arrow k in FIG. 11 following the behavior of the upper air bag 3. Accordingly, there is a possibility that, owing to the rotations of both air bags 3 and 4, the upper and lower air bags 3 and 4 escape like being extruded to a shoulder anchor 1c side (left side in FIG. 11) in a vehicle width direction, leading to unstable behaviors of both air bags when a load of the vehicle occupant C is applied thereto.

The present invention has been made in consideration of the above-described problem. It is an object of the present invention to provide a vehicle occupant restraint system and a vehicle occupant restraint method, which prevent behaviors of the air bags divided into upper and lower parts from being unstable, thus making it possible to restrain a vehicle occupant more stably.

The first aspect of the present invention provides a vehicle occupant restraint system comprising: a seat belt restraint device including a shoulder belt which restrains a body of a vehicle occupant diagonally from one of shoulders to a chest, and a lap belt which restrains a waist of the vehicle occupant; an upper air bag supported by an upper support point provided on the shoulder belt; a lower air bag supported by a lower support point provided on the lap belt and coming into contact with the upper air bag in a vertical direction when being inflated and extended; and an air bag movement inhibiting structure which applies, to at least one of the upper support point and the lower support point, a moment in a direction of canceling movements of contact surfaces of the upper and lower air bags toward a side in a vehicle width direction, where a part of the shoulder belt is located above the shoulder of the vehicle occupant, when the upper air bag and the lower air bag receive inertial force of the vehicle occupant toward the front of a vehicle.

The second aspect of the present invention provides a vehicle occupant restraint method comprising: preparing: a seat belt restraint device including a shoulder belt which restrains a body of a vehicle occupant diagonally from one of shoulders to a chest and a lap belt which restrains a waist of the vehicle occupant; an upper air bag supported by an upper support point provided on the shoulder belt; and a lower air bag supported by a lower support point provided on the lap belt; and allowing the upper support point and/or the lower support point to generate a moment in a direction of canceling movements of contact surfaces of the upper and lower air bags toward a side in a vehicle width direction, where a part of the shoulder belt is located above the shoulder of the vehicle occupant, when the upper air bag and the lower air bag receive inertial force of the vehicle occupant toward a front of a vehicle.

The third aspect of the present invention provides a vehicle occupant restraint system comprising: a seat belt restraint device including a shoulder belt which restrains the body of a vehicle occupant diagonally from one of the shoulders to the chest, and a lap belt which restrains the waist of the vehicle occupant; an upper air bag supported by an upper support point provided on the shoulder belt; a lower air bag supported by a lower support point provided on the lap belt and coming into contact with the upper air bag in a vertical direction when being inflated and extended; and air bag movement inhibiting means for applying, to at least one of the upper support point and the lower support point, a moment in a direction of canceling movements of contact surfaces of the upper and lower air bags toward a side in the vehicle width direction, where a part of the shoulder belt is located above the shoulder of the vehicle occupant, when the upper air bag and the lower air bag receive inertial force of the vehicle occupant toward a front of a vehicle.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

(First Embodiment)

Figure 1:
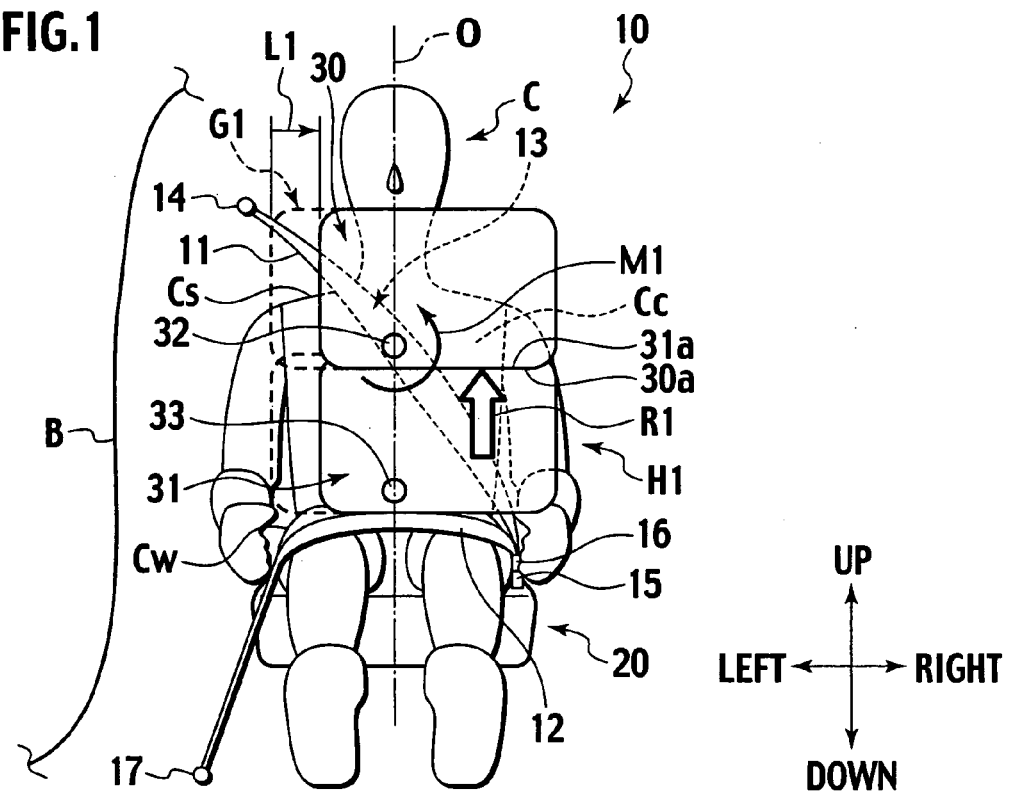
FIG. 1 is a front view showing a state of upper and lower air bags extended between the head and thighs of a vehicle occupant in a first embodiment of the present invention.

FIG. 1 shows a first embodiment of a vehicle occupant restraint system of the present invention.

As shown in FIG. 1, a vehicle occupant restraint system 10 of this embodiment includes a seat belt restraint device 13 having a shoulder belt 11 for restraining the body of a vehicle occupant C diagonally from one of the shoulders, which is denoted by reference numeral Cs, to the chest Cc, and having a lap belt 12 for restraining the waist Cw of the vehicle occupant C. An upper end of the shoulder belt 11 is supported on a vehicle body B through a shoulder anchor 14, and a lower end of the shoulder belt 11 is freely detachably engaged, through a tongue 16, with an inner buckle 15 provided on a lower portion of the vehicle body, which is on an opposite side of the vehicle occupant C seated on a seat 20 from the shoulder anchor 14.

Moreover, one end of the lap belt 12 (on the right side of FIG. 1) is freely slidably continuous with the lower end of the shoulder belt 11 at a portion of the tongue 16, and the other end of the lap belt 12 (on the left side of FIG. 1) is supported on the lower portion of the vehicle body through a lap anchor 17. Note that a seat belt retractor (not shown) is provided on at least one side of the shoulder anchor 14 and the lap anchor 17.

In front of the vehicle occupant C, an upper air bag 30 and a lower air bag 31, which are inflated and extended in the case of emergency such as a frontal collision, are provided. The upper and lower air bags 30 and 31 are folded in normal times, the upper air bag 30 is stored in the shoulder belt 11, and the lower air bag 31 is stored in the lap belt 12.

The upper air bag 30 is supported by an upper support point 32 provided on the shoulder belt 11, and the lower air bag 31 is supported by a lower support point 33 provided on the lap belt 12.

Then, the upper air bag 30 and the lower air bag 31, which have been inflated and extended in the case of emergency, come into contact with each other on contact surfaces thereof as shown in FIG. 1. Specifically, a lower surface 30a of the upper air bag 30 and an upper surface 31a of the lower air bag 31 contact each other in the vertical direction. In such a way, the upper air bag 30 with which the head of the vehicle occupant interferes in the case of the frontal collision is supported by the thighs of the vehicle occupant C through the lower airbag 31, thus making it possible to prevent the vehicle occupant C from moving toward the front of a vehicle.

Here, the vehicle occupant restraint system 10 of the present invention includes an upper air bag movement inhibiting structure H1 for inhibiting movements of the upper air bag 30 and the lower air bag 31 to the vehicle body B side when the upper air bag 30 and the lower air bag 31 receive inertial force of the vehicle occupant toward the front of the vehicle. The upper air bag movement inhibiting structure H1 applies a moment M1 functioning in the following way around the upper support point 32. The moment M1 functions in a direction of canceling movements of the lower and upper surfaces 30a and 31a as contact surfaces of the upper and lower air bags 30 and 31 toward a side (left side of FIG. 1) in the vehicle width direction, where a part of the shoulder belt 11 is located above the shoulder of the vehicle occupant. In other words, to the upper support point 32, the upper air bag movement inhibiting structure H1 applies the counterclockwise moment M1 for inhibiting the movements of the lower surface 30a and the upper surface 31a toward a side in the vehicle width direction, where the shoulder anchor 14 is disposed.

Moreover, a vehicle occupant restraint method of the present invention allows the upper support point 32 and/or the lower support point 33 to generate the moment M1 in the direction of canceling the movements of the lower and upper surfaces 30a and 31a toward the side in the vehicle width direction, where a part of the shoulder belt 11 is located above the shoulder of the vehicle occupant when the upper air bag 30 and the lower air bag 31 receive the inertial force of the vehicle occupant toward the front of the vehicle.

The upper air bag movement inhibiting structure H1 adopts an upper/lower air bag eccentric structure G1 in which the upper air bag 30 and the lower air bag 31 are offset by a predetermined amount L1 from a center O of the vehicle occupant to a side (right side in FIG. 1) in the vehicle width direction, where the shoulder belt 11 and the lap belt 12 are continuous with each other. Hence, according to this embodiment, when the upper air bag 30 and the lower air bag 31 receive the inertial force of the vehicle occupant toward the front of the vehicle owing to the frontal collision, the counterclockwise moment M1 can be generated around the upper support point 32 by the upper/lower air bag eccentric structure G1. Specifically, in the upper/lower air bag eccentric structure G1, the upper air bag 30 and the lower air bag 31 are offset to the right side in FIG. 1 from the center O of the vehicle occupant. Accordingly, reaction force R1 applied to the lower surface 30a of the upper air bag 30 from the lower air bag 31 is increased in such an offset direction, and the moment M1 can be generated by the reaction force R1. Hence, rotations of the lower and upper surfaces 30a and 31a as the contact surfaces of the upper and lower air bags 30 and 31 in a direction of escaping to the vehicle body B side are restricted by the moment M1, and behaviors of the upper and lower air bags 30 and 31 can be stabilized, thus making it possible to further enhance the protection performance for the vehicle occupant C.

(Second Embodiment)

Figure 2:
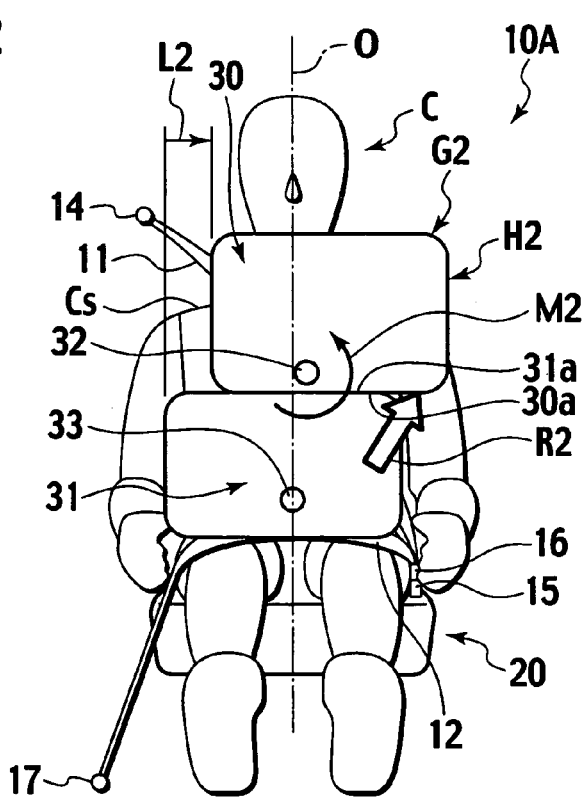
FIG. 2 is a front view showing a state of the upper and lower air bags extended between the head and thighs of the vehicle occupant in a second embodiment of the present invention.

FIG. 2 shows a second embodiment of the present invention, in which the same reference numerals are assigned to the same constituents as those of the first embodiment, and duplicate description thereof is omitted. Note that, though the vehicle body B is not shown in FIGS. 2 to 8, the vehicle body B exists by the side of the vehicle occupant C also in FIGS. 2 to 8 as in FIG. 1.

A vehicle occupant restraint system 10A of this embodiment basically has a substantially similar construction to that of the first embodiment. The vehicle occupant restraint system 10A includes the upper air bag 30 supported on the shoulder belt 11 through the upper support point 32, and the lower air bag 31 supported on the lap belt 12 through the lower support point 33. Then, the vehicle occupant restraint system 10A includes an upper air bag movement inhibiting structure H2 for applying a counterclockwise moment M2 to the upper support point 32 when receiving the inertial force of the vehicle occupant.

The upper air bag movement inhibiting structure H2 adopts an upper air bag eccentric structure G2 in which the upper air bag 30 is offset by a predetermined amount L2 from the center O of the vehicle occupant to a side in the vehicle width direction, where the shoulder belt 11 and the lap belt 12 are continuous with each other, that is, to the center of a vehicle cabin.

Hence, according to this embodiment, when the upper air bag 30 and the lower air bag 31 receive the inertial force of the vehicle occupant toward the front of the vehicle owing to the frontal collision, the counterclockwise moment M2 can be generated around the upper support point 32 by the upper air bag eccentric structure G2 as in the first embodiment. Specifically, in the upper air bag eccentric structure G2, the air bag 30 is offset from the center O of the vehicle occupant to the side of the vehicle width direction, where the shoulder belt 11 and the lap belt 12 are continuous with each other. Accordingly, reaction force R2 applied to the lower surface 30a of the upper air bag 30 from the lower air bag 31 is increased in such an offset direction, and the moment M2 can be generated by the reaction force R2. Hence, the rotations of the lower and upper surfaces 30a and 31a as the contact surfaces of the upper and lower air bags 30 and 31 in the direction of escaping to the vehicle body B side are restricted by the moment M2, and the behaviors of the upper and lower air bags 30 and 31 can be stabilized, thus making it possible to further enhance the protection performance for the vehicle occupant C.

(Third Embodiment)

Figure 3:
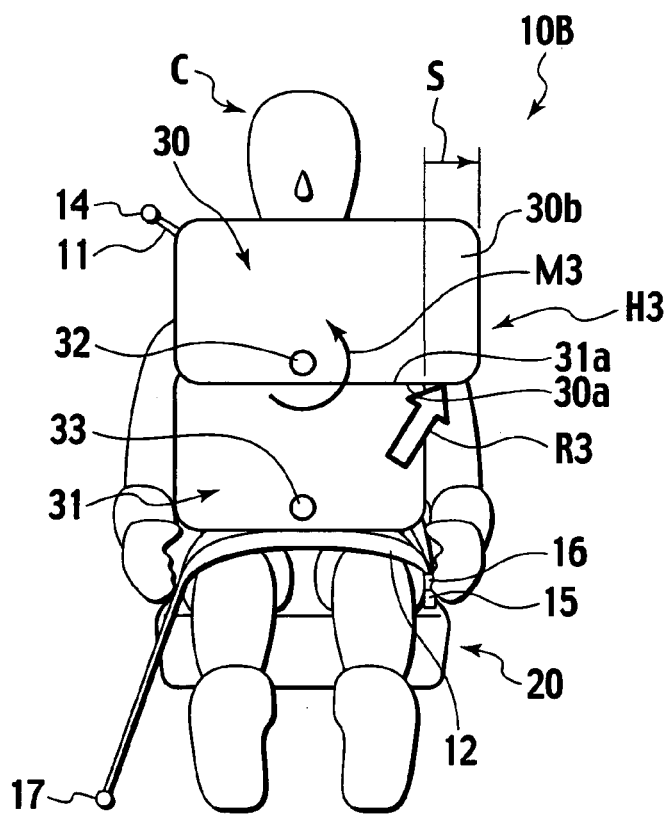
FIG. 3 is a front view showing a state of the upper and lower air bags extended between the head and thighs of the vehicle occupant in a third embodiment of the present invention.

FIG. 3 shows a third embodiment of the present invention, in which the same reference numerals are assigned to the same constituents as those of the first embodiment, and duplicate description thereof is omitted.

A vehicle occupant restraint system 10B of this embodiment basically has a substantially similar construction to that of the first embodiment. The vehicle occupant restraint system 10B includes the upper air bag 30 supported on the shoulder belt 11 through the upper support point 32, and the lower air bag 31 supported on the lap belt 12 through the lower support point 33. Then, the vehicle occupant restraint system 10B includes an upper air bag movement inhibiting structure H3 for applying a counterclockwise moment M3 to the upper support point 32 when receiving the inertial force of the vehicle occupant.

The upper air bag movement inhibiting structure H3 is composed of an extended portion 30b provided in the upper air bag 30 and formed with a predetermined protruding amount S on the side in the vehicle width direction, where the shoulder belt 11 and the lap belt 12 are continuous with each other.

Hence, according to this embodiment, when the upper air bag 30 and the lower air bag 31 receive the inertial force of the vehicle occupant toward the front of the vehicle owing to the frontal collision, the counterclockwise moment M3 can be generated around the upper support point 32 by the extended portion 30b as in the first embodiment. Specifically, in this embodiment, the extended portion 30b is provided in the upper air bag 30. Accordingly, reaction force R3 applied to the lower surface 30a of the upper air bag 30 from the lower air bag 31 is increased in a direction of the extended portion 30b, and the moment M3 can be generated by the reaction force R3. Hence, the rotations of the lower and upper surfaces 30a and 31a as the contact surfaces of the upper and lower air bags 30 and 31 in the direction of escaping to the vehicle body B side are restricted by the moment M3, and the behaviors of the upper and lower air bags 30 and 31 can be stabilized, thus making it possible to further enhance the protection performance for the vehicle occupant C.

(Fourth Embodiment)

Figure 4:
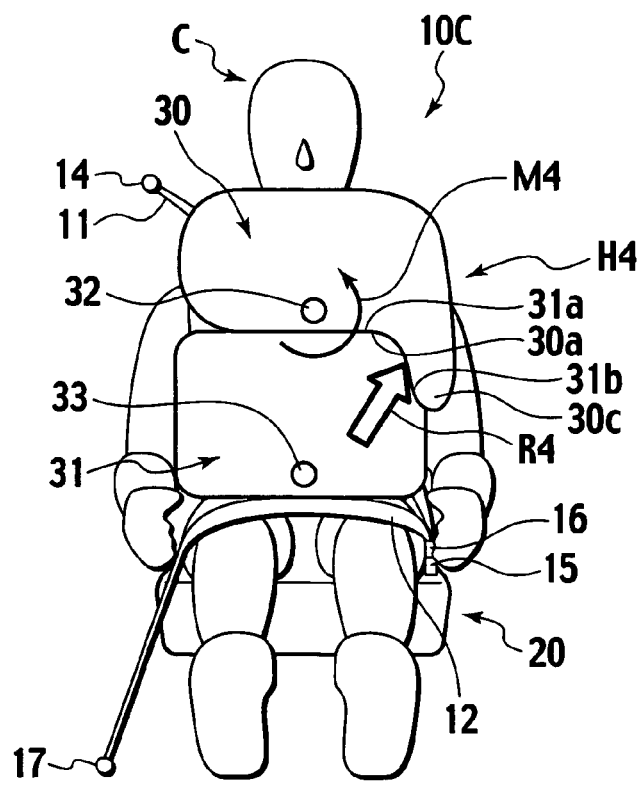
FIG. 4 is a front view showing a state of the upper and lower air bags extended between the head and thighs of the vehicle occupant in a fourth embodiment of the present invention.

FIG. 4 shows a fourth embodiment of the present invention, in which the same reference numerals are assigned to the same constituents as those of the first embodiment, and duplicate description thereof is omitted.

A vehicle occupant restraint system 10C of this embodiment basically has a substantially similar construction to that of the first embodiment. The vehicle occupant restraint system 10C includes the upper air bag 30 supported on the shoulder belt 11 through the upper support point 32, and the lower air bag 31 supported on the lap belt 12 through the lower support point 33. Then, the vehicle occupant restraint system 10C includes an upper air bag movement inhibiting structure H4 for applying a counterclockwise moment M4 to the upper support point 32 when receiving the inertial force of the vehicle occupant.

The upper air bag movement inhibiting structure H4 is composed of an upper protruding portion 30c provided in the upper air bag 30. The upper protruding portion 30c protrudes downward from the side in the vehicle width direction of the upper air bag 30, where the shoulder belt 11 and the lap belt 12 are continuous with each other. Then, the upper protruding portion 30c is engaged with a side surface 31b on a side in the vehicle width direction of the lower air bag 31, where the shoulder belt 11 and the lap belt 12 are continuous with each other.

Hence, according to this embodiment, when the upper air bag 30 and the lower air bag 31 receive the inertial force of the vehicle occupant toward the front of the vehicle owing to the frontal collision, the counterclockwise moment M4 can be generated around the upper support point 32 by the upper protruding portion 30c as in the first embodiment. Specifically, the upper protruding portion 30c protrudes from the upper air bag 30, and is engaged with the side surface 31b of the lower air bag 31. Accordingly, reaction force R4 applied to the lower surface 30a of the upper air bag 30 from the lower air bag 31 is received on the upper protruding portion 30c, and the moment M4 can be generated by the reaction force R4. Hence, the rotations of the lower and upper surfaces 30a and 31a as the contact surfaces of the upper and lower air bags 30 and 31 in the direction of escaping to the vehicle body B side are restricted by the moment M4, and the behaviors of the upper and lower air bags 30 and 31 can be stabilized, thus making it possible to further enhance the protection performance for the vehicle occupant C.

(Fifth Embodiment)

Figure 5:
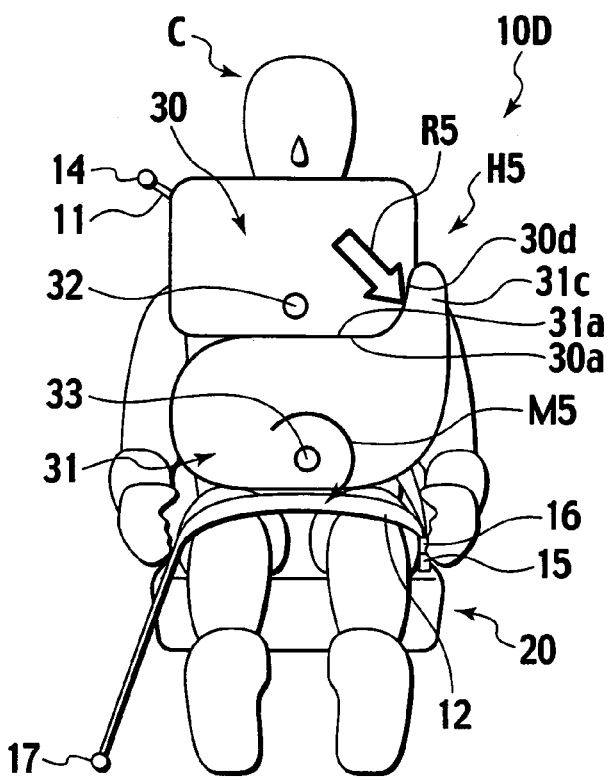
FIG. 5 is a front view showing a state of the upper and lower air bags extended between the head and thighs of the vehicle occupant in a fifth embodiment of the present invention.

FIG. 5 shows a fifth embodiment of the present invention, in which the same reference numerals are assigned to the same constituents as those of the first embodiment, and duplicate description thereof is omitted.

A vehicle occupant restraint system 10D of this embodiment basically has a substantially similar construction to that of the first embodiment. The vehicle occupant restraint system 10D includes the upper air bag 30 supported on the shoulder belt 11 through the upper support point 32, and the lower air bag 31 supported on the lap belt 12 through the lower support point 33.

Then, the vehicle occupant restraint system 10D includes a lower air bag movement inhibiting structure H5 for preventing the upper air bag 30 and the lower air bag 31 from moving to the vehicle body B side when the upper air bag 30 and the lower air bag 31 receive the inertial force of the vehicle occupant toward the front of the vehicle. The lower air bag movement inhibiting structure H5 applies a clockwise moment M5 to the lower support point 33 in a direction of canceling the movements of the lower and upper surfaces 30a and 31a as the contact surfaces of the upper and lower air bags 30 and 31 toward the side in the vehicle width direction, where a part of the shoulder belt 11 is located above the shoulder of the vehicle occupant.

The lower air bag movement inhibiting structure H5 is composed of a lower protruding portion 31c provided in the lower air bag 31. The lower protruding portion 31c protrudes upward on the side in the vehicle width direction of the lower air bag 31, where the shoulder belt 11 and the lap belt 12 are continuous with each other. Then, the lower protruding portion 31c is engaged with a side surface 30d on the side in the vehicle width direction of the upper air bag 30, where the shoulder belt 11 and the lap belt 12 are continuous with each other.

Hence, according to this embodiment, when the upper air bag 30 and the lower air bag 31 receive the inertial force of the vehicle occupant toward the front of the vehicle owing to the frontal collision, the clockwise moment M5 can be generated around the lower support point 33 by the lower protruding portion 31c. Specifically, the lower protruding portion 31c protrudes from the lower air bag 31, and is engaged with the side surface 30d of the upper air bag 30. Accordingly, reaction force R5 applied to the upper surface 31a of the lower air bag 31 from the upper air bag 30 is received on the lower protruding portion 31c, and the moment M5 can be generated by the reaction force R5. Hence, the rotations of the lower and upper surfaces 30a and 31a as the contact surfaces of the upper and lower air bags 30 and 31 in the direction of escaping to the vehicle body B side are restricted by the moment M5, and the behaviors of the upper and lower air bags 30 and 31 can be stabilized, thus making it possible to further enhance the protection performance for the vehicle occupant C.

(Sixth Embodiment)

Figure 6:
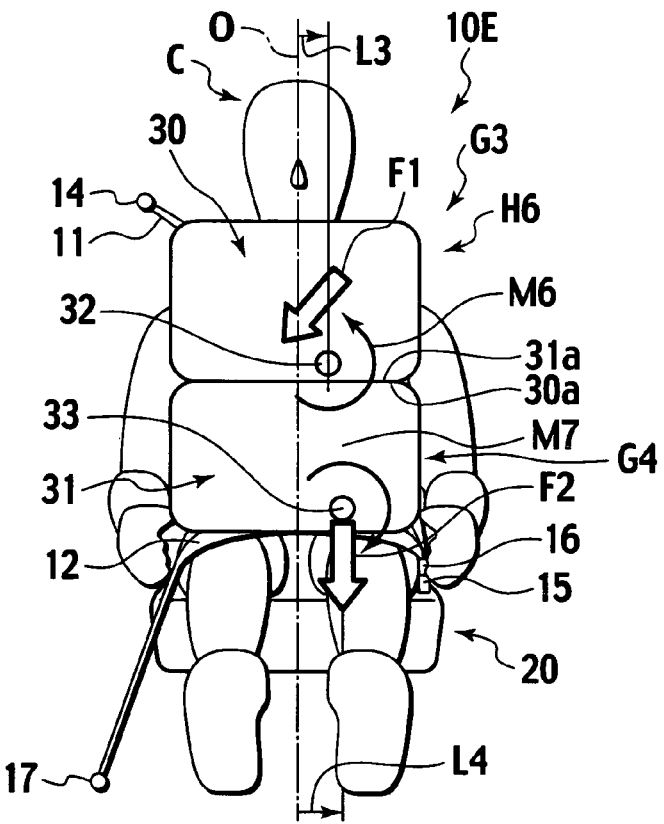
FIG. 6 is a front view showing a state of the upper and lower air bags extended between the head and thighs of the vehicle occupant in a sixth embodiment of the present invention.

FIG. 6 shows a sixth embodiment of the present invention, in which the same reference numerals are assigned to the same constituents as those of the first embodiment, and duplicate description thereof is omitted.

A vehicle occupant restraint system 10E of this embodiment basically has a substantially similar construction to that of the first embodiment. The vehicle occupant restraint system 10E includes the upper air bag 30 supported on the shoulder belt 11 through the upper support point 32, and the lower air bag 31 supported on the lap belt 12 through the lower support point 33. Then, the vehicle occupant restraint system 10E includes an upper/lower air bag movement inhibiting structure H6 for applying a counterclockwise moment M6 to the upper support point 32, and further applying a clockwise moment M7 to the lower support point 33, when receiving the inertial force of the vehicle occupant.

The upper/lower air bag movement inhibiting structure H6 applies the moments M6 and M7 to the upper and lower support points 32 and 33 in directions of canceling the movements of the lower and upper surfaces 30a and 31a toward the side in the vehicle width direction, where a part of the shoulder belt 11 is located above the shoulder of the vehicle occupant, when the upper air bag 30 and the lower air bag 31 receive the inertial force of the vehicle occupant toward the front of the vehicle. The upper/lower air bag movement inhibiting structure H6 is composed of an upper support point eccentric structure G3 and a lower support point eccentric structure G4. The upper support point eccentric structure G3 is a structure in which the upper support point 32 is offset by a predetermined amount L3 from the center O of the vehicle occupant to the side in the vehicle width direction, where the shoulder belt 11 and the lap belt 12 are continuous with each other. Moreover, the lower support point eccentric structure G4 is a structure in which the lower support point 33 is offset by a predetermined amount L4 from the center O of the vehicle occupant to the side in the vehicle width direction, where the shoulder belt 11 and the lap belt 12 are continuous with each other.

Hence, according to this embodiment, when the upper air bag 30 and the lower air bag 31 receive the inertial force of the vehicle occupant toward the front of the vehicle owing to the frontal collision, the moment M6 can be applied to the upper support point 32 by the upper support point eccentric structure G3. Specifically, in the upper support point eccentric structure G3, the upper support point 32 is offset from the center O of the vehicle occupant to the right side in FIG. 6, and accordingly, inertial force F1 of the vehicle occupant passes through an opposite side of the upper support point 32 in such an offset direction, and the moment M6 is thus generated. Therefore, the rotation of the upper air bag 30 in the direction of escaping to the vehicle body B side can be restricted. Meanwhile, in the lower support point eccentric structure G4, the lower support point 33 is offset from the center O of the vehicle occupant to the right side in FIG. 6, and accordingly, force F2 to restrict elevation of an offset portion of the lower air bag 31 is applied to the lower support point 33, and the moment M7 is thus generated. Therefore, the rotation of the lower air bag 31 in the direction of escaping to the vehicle body B side can be restricted. Hence, the rotations of the lower and upper surfaces 30a and 31a as the contact surfaces of the upper and lower air bags 30 and 31 in the direction of escaping to the vehicle body B side are restricted by the moments M6 and M7, and the behaviors of the upper and lower air bags 30 and 31 can be stabilized, thus making it possible to further enhance the protection performance for the vehicle occupant C.

(Seventh Embodiment)

Figure 7:
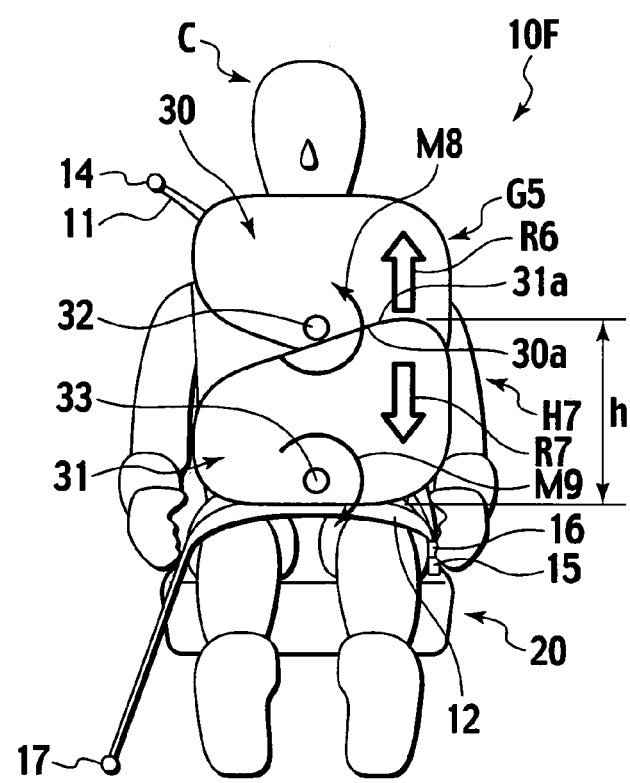
FIG. 7 is a front view showing a state of the upper and lower air bags extended between the head and thighs of the vehicle occupant in a seventh embodiment of the present invention.

FIG. 7 shows a seventh embodiment of the present invention, in which the same reference numerals are assigned to the same constituents as those of the first embodiment, and duplicate description thereof is omitted.

A vehicle occupant restraint system 10F of this embodiment basically has a substantially similar construction to that of the first embodiment. The vehicle occupant restraint system 10F includes the upper air bag 30 supported on the shoulder belt 11 through the upper support point 32, and the lower air bag 31 supported on the lap belt 12 through the lower support point 33. Then, the vehicle occupant restraint system 10F includes an upper/lower air bag movement inhibiting structure H7 for applying a counterclockwise moment M8 to the upper support point 32, and further applying a clockwise moment M9 to the lower support point 33, when receiving the inertial force of the vehicle occupant.

The upper/lower air bag movement inhibiting structure H7 applies the moments M8 and M9 to the upper support point 32 and the lower support point 33 in the directions of canceling the movements of the lower and upper surfaces 30a and 31a toward the side in the vehicle width direction, where a part of the shoulder belt 11 is located above the shoulder of the vehicle occupant, when the upper air bag 30 and the lower air bag 31 receive the inertial force of the vehicle occupant toward the front of the vehicle. The upper/lower air bag movement inhibiting structure H7 adopts a contact surface height changing structure G5 in which a height h of the lower air bag 31 on the side in the vehicle width direction, where the shoulder belt 11 and the lap belt 12 are continuous with each other, is set relatively higher than that on an opposite side of the side concerned.

Hence, according to this embodiment, when the upper air bag 30 and the lower air bag 31 receive the inertial force of the vehicle occupant toward the front of the vehicle owing to the frontal collision, the contact surface height changing structure G5 can apply the moments M8 and M9 to the upper support point 32 and the lower support point 33. Specifically, in the upper/lower air bag movement inhibiting structure H7, the height h of the contact surfaces of the upper air bag 30 and the lower air bag 31 on the right side in FIG. 7 in the vehicle width direction is set relatively higher than that on the opposite side. Accordingly, both reaction forces R6 and R7 generated by the inertial force of the vehicle occupant in the upper and lower air bags 30 and 31 are increased more on the side (right side in FIG. 7) where the contact surfaces get higher. Therefore, the moments M8 and M9 generated by the reaction forces R6 and R7 are applied to the upper support point 32 and the lower support point 33, and the rotations of the upper and lower air bags 30 and 31 in the directions of escaping to the vehicle body B side can be restricted. Hence, the rotations of the lower and upper surfaces 30a and 31a as the contact surfaces of the upper and lower air bags 30 and 31 in the directions of escaping to the vehicle body B side are restricted by the moments M8 and M9, and the behaviors of the upper and lower air bags 30 and 31 can be stabilized, thus making it possible to further enhance the protection performance for the vehicle occupant C.

(Eighth Embodiment)

Figure 8:
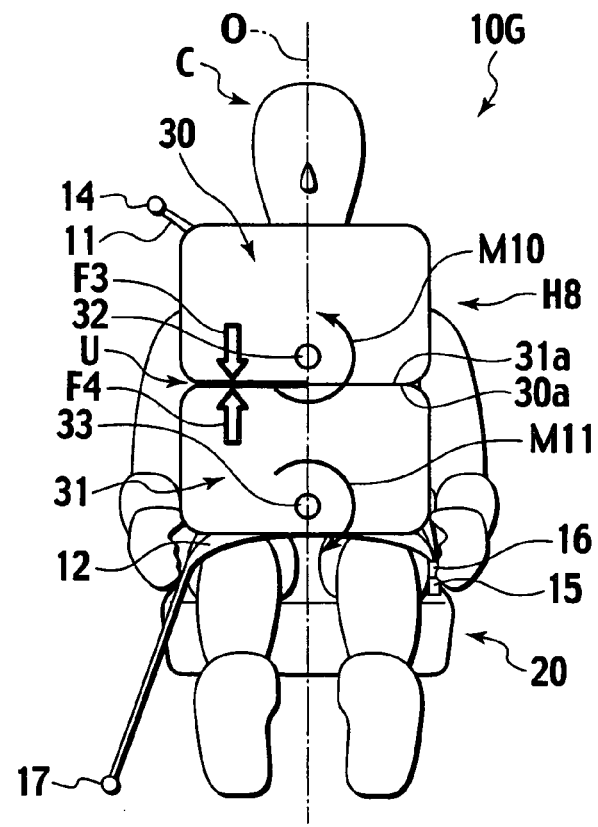
FIG. 8 is a front view showing a state of the upper and lower air bags extended between the head and thighs of the vehicle occupant in an eighth embodiment of the present invention.

FIG. 8 shows an eighth embodiment of the present invention, in which the same reference numerals are assigned to the same constituents as those of the first embodiment, and duplicate description thereof is omitted.

A vehicle occupant restraint system 10G of this embodiment basically has a substantially similar construction to that of the first embodiment. The vehicle occupant restraint system 10G includes the upper air bag 30 supported on the shoulder belt 11 through the upper support point 32, and the lower air bag 31 supported on the lap belt 12 through the lower support point 33. Then, the vehicle occupant restraint system 10G includes an upper/lower air bag movement inhibiting structure H8 for applying a counterclockwise moment M10 to the upper support point 32, and further applying a clockwise moment M11 to the lower support point 33, when receiving the inertial force of the vehicle occupant.

The upper/lower air bag movement inhibiting structure H8 applies the moments M10 and M11 to the upper support point 32 and the lower support point 33 in the directions of canceling the movements of the lower surface 30a and the upper surface 31a toward the side in the vehicle width direction, where a part of the shoulder belt 11 is located above the shoulder of the vehicle occupant, when the upper air bag 30 and the lower air bag 31 receive the inertial force of the vehicle occupant toward the front of the vehicle. The upper/lower air bag movement inhibiting structure H8 is composed as a coupling member U, which is provided between the lower surface 30a of the upper air bag 30 and the upper surface 31a of the lower air bag 31, and couples the upper air bag 30 and the lower air bag 31 to each other. A hook and loop fastener or an adhesive is used as the coupling member U. In this embodiment, the coupling member U is attached on the side in the vehicle width direction, where a part of the shoulder belt 11 is located above the shoulder of the vehicle occupant, with respect to the center O of the vehicle occupant.

Hence, according to this embodiment, when the upper air bag 30 and the lower air bag 31 receive the inertial force of the vehicle occupant toward the front of the vehicle owing to the frontal collision, the moments M10 and M11 can be generated by the coupling member U. Specifically, when the upper air bag 30 and the lower air bag 31 are inflated and extended to contact each other, the coupling member U couples the upper air bag 30 and the lower air bag 31 to each other. In such a way, forces F3 and F4 are applied, which are to prevent the lower and upper surfaces 30a and 31a of the upper and lower air bags 30 and 31 from being separated from each other. Then, by the forces F3 and F4, the moments M10 and M11 in the directions of restricting the escapes of the upper air bag 30 and the lower air bag 31 are applied to the upper support point 32 and the lower support point 33, respectively, and the rotations of the upper air bag 30 and the lower air bag 31 in the directions of escaping to the vehicle body B side can be restricted. Hence, the rotations of the lower and upper surfaces 30a and 31a as the contact surfaces of the upper and lower air bags 30 and 31 in the directions of escaping to the vehicle body B side are restricted by the moments M10 and M11, and the behaviors of the upper and lower air bags 30 and 31 can be stabilized, thus making it possible to further enhance the protection performance for the vehicle occupant C.

(Ninth Embodiment)

Figure 9:
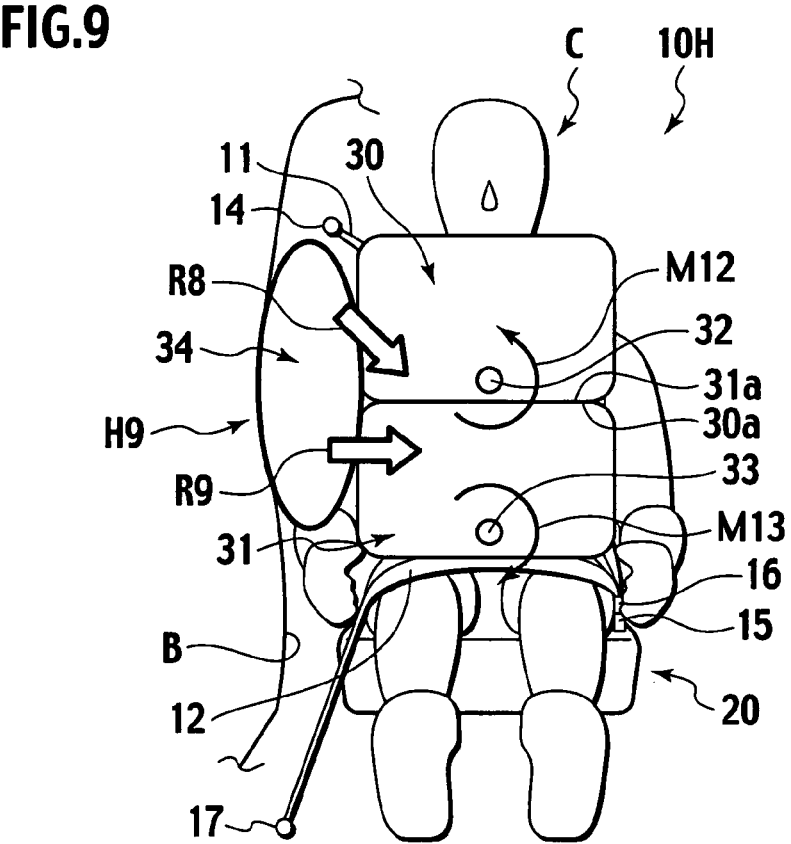
FIG. 9 is a front view showing a state of the upper and lower air bags extended between the head and thighs of the vehicle occupant in a ninth embodiment of the present invention.
Figure 10:
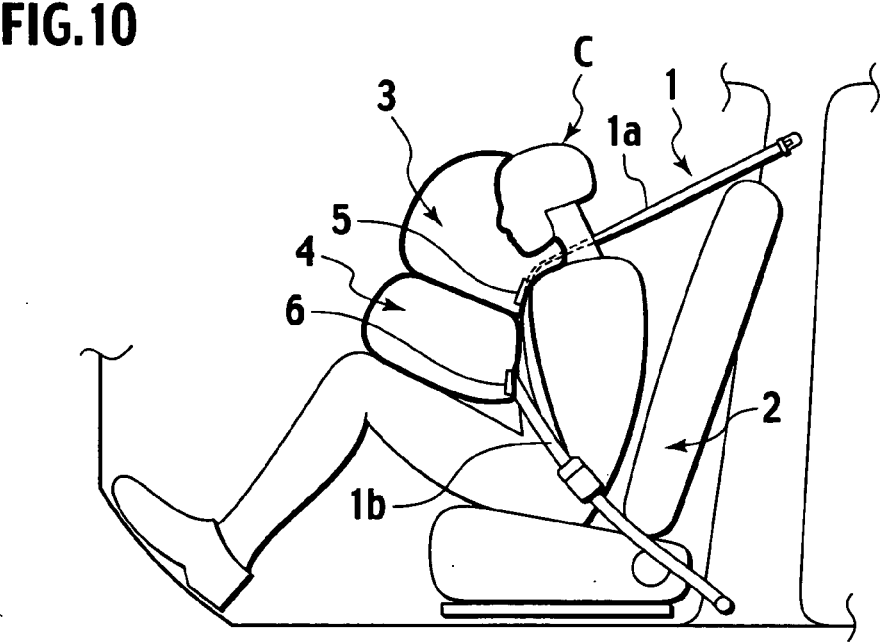
FIG. 10 is a side view showing a vehicle occupant restraint system as a related art.
Figure 11:
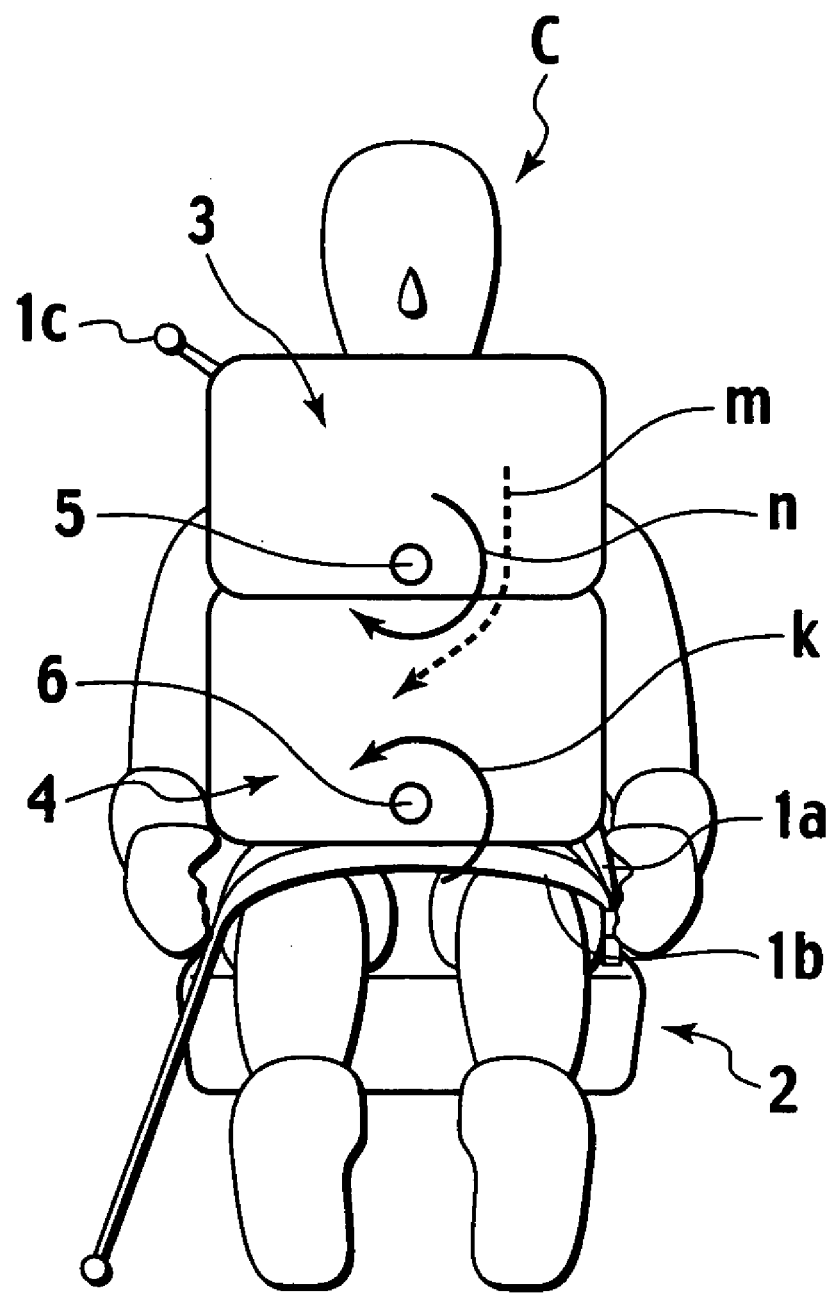
FIG. 11 is a front view showing the vehicle occupant restraint system as the related art.

FIG. 9 shows a ninth embodiment of the present invention, in which the same reference numerals are assigned to the same constituents as those of the first embodiment, and duplicate description thereof is omitted.

A vehicle occupant restraint system 10H of this embodiment basically has a substantially similar construction to that of the first embodiment. The vehicle occupant restraint system 10H includes the upper air bag 30 supported on the shoulder belt 11 through the upper support point 32, and the lower air bag 31 supported on the lap belt 12 through the lower support point 33. Then, the vehicle occupant restraint system 10H includes an upper/lower air bag movement inhibiting structure H9 for applying a counterclockwise moment M12 to the upper support point 32, and further applying a clockwise moment M13 to the lower support point 33, when receiving the inertial force of the vehicle occupant.

When the upper air bag 30 and the lower air bag 31 receive the inertial force of the vehicle occupant toward the front of the vehicle, the upper/lower air bag movement inhibiting structure H9 applies the moments M12 and M13 to the upper and lower support points 32 and 33 in the directions of canceling the movements of the lower surface 30a and the upper surface 31a toward the side in the vehicle width direction, where a part of the shoulder belt 11 is located above the shoulder of the vehicle occupant. The upper/lower air bag movement inhibiting structure H9 is formed of a side air bag 34. The side air bag 34 is provided between the vehicle body B and side surfaces of the upper and lower air bags 30 and 31 on the side in the vehicle width direction, where a part of the shoulder belt 11 is located above the shoulder of the vehicle occupant. Moreover, the side air bag 34 is inflated and extended in synchronization with the upper and lower air bags 30 and 31, and supports the upper and lower air bags 30 and 31 from the side surfaces thereof.

Hence, according to this embodiment, when the upper and lower air bags 30 and 31 receive the inertial force of the vehicle occupant toward the front of the vehicle owing to the frontal collision, the moments M12 and M13 can be generated by the side air bag 34. Specifically, the side air bag 34 is inflated and extended in synchronization with the upper and lower air bags 30 and 31, and supports the upper and lower air bags 30 and 31 from the side surfaces thereof. Accordingly, reaction forces F8 and F9 are generated for the upper and lower air bags 30 and 31 by the side air bag 34, respectively, and by the reaction forces R8 and R9, the moments M12 and M13 are applied to the upper support points 32 and the lower support points 33, respectively, and the rotations of the upper and lower air bags 30 and 31 in the directions of escaping to the vehicle body B side can be restricted. Hence, the rotations of the lower and upper surfaces 30a and 31a as the contact surfaces of the upper and lower air bags 30 and 31 in the directions of escaping to the vehicle body B side are restricted by the moments M12 and M13, and the behaviors of the upper and lower air bags 30 and 31 can be stabilized, thus making it possible to further enhance the protection performance for the vehicle occupant C.

Incidentally, though the vehicle occupant restraint system of the present invention has been described by taking as examples the first to ninth embodiments, the present invention is not limited to these embodiments, and can adopt other various embodiments within the scope without departing from the gist of the present invention. For example, though the air bag of this application has been applied to a three-point seat belt restraint device including the shoulder belt 11 and the lap belt 12, the seat belt restraint device is not limited to this, and the present invention is also applicable to, for example, a four-point seat belt restraint device.

The entire content of a Japanese Patent Application No. P2004-354096 with a filing date of Dec. 7, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicle occupant restraint system, comprising:
   a seat belt restraint device including a shoulder belt which restrains the body of a vehicle occupant diagonally from one of the shoulders to the chest, and a lap belt which restrains the waist of the vehicle occupant;
   an upper air bag supported by an upper support point provided on the shoulder belt;
   a lower air bag supported by a lower support point provided on the lap belt and coming into contact with the upper air bag in a vertical direction when being inflated and extended; and
   an air bag movement inhibiting structure which applies, to at least one of the upper support point and the lower support point, a moment in a direction of canceling movements of contact surfaces of the upper and lower air bags toward a side in the vehicle width direction, where a part of the shoulder belt is located above the shoulder of the vehicle occupant, when the upper air bag and the lower air bag receive inertial force of the vehicle occupant toward a front of a vehicle.

2. A vehicle occupant restraint system according to claim 1,
   wherein the air bag movement inhibiting structure applies the moment to the upper support point.

3. A vehicle occupant restraint system according to claim 1,
   wherein the air bag movement inhibiting structure applies the moment to the lower support point.

4. A vehicle occupant restraint system according to claim 1,
   wherein the air bag movement inhibiting structure applies the moment to the upper support point and the lower support point.

5. A vehicle occupant restraint system according to claim 2,
   wherein the air bag movement inhibiting structure is a structure in which the upper air bag and the lower air bag are offset from a center of the vehicle occupant to a side in the vehicle width direction, where the shoulder belt and the lap belt are continuous with each other.

6. A vehicle occupant restraint system according to claim 2,
   wherein the air bag movement inhibiting structure is a structure in which the upper air bag is offset from a center of the vehicle occupant to a side in the vehicle width direction, where the shoulder belt and the lap belt are continuous with each other.

7. A vehicle occupant restraint system according to claim 2,
   wherein the air bag movement inhibiting structure is an extended portion formed on a side in the vehicle width direction, where the shoulder belt and the lap belt are continuous with each other, and formed by extending a part of the upper air bag.

8. A vehicle occupant restraint system according to claim 2,
   wherein the air bag movement inhibiting structure is an upper protruding portion provided in the upper air bag and formed on a side in the vehicle width direction, where the shoulder belt and the lap belt are continuous with each other, and
   the upper protruding portion is engaged with a side surface of the lower air bag on the side in the vehicle width direction, where the shoulder belt and the lap belt are continuous with each other.

9. A vehicle occupant restraint system according to claim 3,
wherein the air bag movement inhibiting structure is a lower protruding portion provided in the lower air bag and formed on a side in the vehicle width direction, where the shoulder belt and the lap belt are continuous with each other, and
the lower protruding portion is engaged with a side surface of the upper air bag on the side in the vehicle width direction, where the shoulder belt and the lap belt are continuous with each other.

10. A vehicle occupant restraint system according to claim 2,
wherein the air bag movement inhibiting structure is a structure in which the upper support point is offset from a center of the vehicle occupant to a side in the vehicle width direction, where the shoulder belt and the lap belt are continuous with each other.

11. A vehicle occupant restraint system according to claim 3,
wherein the air bag movement inhibiting structure is a structure in which the lower support point is offset from a center of the vehicle occupant to a side in the vehicle width direction, where the shoulder belt and the lap belt are continuous with each other.

12. A vehicle occupant restraint system according to claim 4,
wherein the air bag movement inhibiting structure is a structure in which a height of the contact surfaces of the upper air bag and the lower air bag on a side in the vehicle width direction, where the shoulder belt and the lap belt are continuous with each other, is set higher than a height on the side in the vehicle width direction, where a part of the shoulder belt is located above the shoulder of the vehicle occupant.

13. A vehicle occupant restraint system according to claim 4,
wherein the air bag movement inhibiting structure is a coupling structure which couples the upper and lower air bags to each other when the upper and lower air bags are inflated and extended to contact each other, the coupling structure being provided between a lower surface of the upper air bag and an upper surface of the lower air bag.

14. A vehicle occupant restraint system according to claim 4,
wherein the air bag movement inhibiting structure is a side air bag which supports the upper and lower air bags from side surfaces thereof on the side in the vehicle width direction, where a part of the shoulder belt is located above the shoulder of the vehicle occupant, by being inflated and extended in synchronization with the upper and lower air bags, the side air bag being provided between the side surfaces and a vehicle body.

15. A vehicle occupant restraint method, comprising:
preparing: a seat belt restraint device including a shoulder belt which restrains the body of a vehicle occupant diagonally from one of the shoulders to the chest and a lap belt which restrains the waist of the vehicle occupant; an upper air bag supported by an upper support point provided on the shoulder belt; and a lower air bag supported by a lower support point provided on the lap belt; and
allowing the upper support point and/or the lower support point to generate a moment in a direction of canceling movements of contact surfaces of the upper and lower air bags toward a side in a vehicle width direction, where a part of the shoulder belt is located above the shoulder of the vehicle occupant, when the upper air bag and the lower air bag receive inertial force of the vehicle occupant toward a front of a vehicle.

16. A vehicle occupant restraint system, comprising:
a seat belt restraint device including a shoulder belt which restrains the body of a vehicle occupant diagonally from one of the shoulders to the chest, and a lap belt which restrains the waist of the vehicle occupant;
an upper air bag supported by an upper support point provided on the shoulder belt;
a lower air bag supported by a lower support point provided on the lap belt and coming into contact with the upper air bag in a vertical direction when being inflated and extended; and
air bag movement inhibiting means for applying, to at least one of the upper support point and the lower support point, a moment in a direction of canceling movements of contact surfaces of the upper and lower air bags toward a side in a vehicle width direction, where a part of the shoulder belt is located above the shoulder of the vehicle occupant, when the upper air bag and the lower air bag receive inertial force of the vehicle occupant toward a front of a vehicle.

* * * * *